(12) United States Patent
Kurz et al.

(10) Patent No.: US 6,489,388 B1
(45) Date of Patent: Dec. 3, 2002

(54) POLYOXYMETHYLENE MOLDINGS HAVING IMPROVED RESISTANCE TO DIESEL FUEL AND AGGRESSIVE GASOLINE

(75) Inventors: Klaus Kurz, Kelsterbach (DE); Kurt Witan, Hofheim (DE); Bernhard Forschler, Darmstadt (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/586,036

(22) Filed: Jun. 2, 2000

(30) Foreign Application Priority Data

Jun. 4, 1999 (DE) ............................. 199 25 491

(51) Int. Cl.⁷ .................... C08K 3/22; C08L 59/02; C08L 61/00
(52) U.S. Cl. ........................... 524/432; 524/542
(58) Field of Search .................... 524/432, 542, 524/378

(56) References Cited

U.S. PATENT DOCUMENTS

| | | | |
|---|---|---|---|
| 4,493,751 A | | 1/1985 | Cherdron et al. |
| 4,517,319 A | * | 5/1985 | Reske et al. ............ 523/200 |
| 5,063,263 A | * | 11/1991 | Hayes et al. ............ 524/101 |
| 5,432,216 A | * | 7/1995 | Yu et al. ................ 524/102 |
| 5,519,075 A | * | 5/1996 | Matsumoto et al. ..... 524/100 |
| 5,919,530 A | * | 7/1999 | Hurley et al. ........... 427/557 |
| 5,952,410 A | * | 9/1999 | Yokoyama et al. ...... 524/210 |
| 6,077,908 A | * | 6/2000 | Yahiro .................. 525/218 |
| 6,147,146 A | * | 11/2000 | Horio et al. ............. 524/100 |
| 6,211,268 B1 | * | 4/2001 | Matsumura et al. ..... 524/100 |
| 6,284,828 B1 | * | 9/2001 | Takayama .............. 524/413 |

FOREIGN PATENT DOCUMENTS

| | | |
|---|---|---|
| DE | 2 947 490 | 6/1981 |
| DE | 197 02 425 | 7/1998 |
| EP | 0010751 | 5/1980 |
| JP | 07150004 | 6/1995 |
| JP | 07228751 | 8/1995 |
| JP | 10130458 | * 5/1998 |

OTHER PUBLICATIONS

English Translation of JP 10130458 (1998).*

* cited by examiner

Primary Examiner—Vasu Jagannathan
Assistant Examiner—Callie E. Shosho
(74) Attorney, Agent, or Firm—Connolly Bove Lodge & Hutz LLP

(57) ABSTRACT

It has been found that, in particular, a molding composition comprising (A) from 80 to 99.8% by weight of a polyoxymethylene homopolymer or copolymer, (B) from 0.1 to 10% by weight of a polyalkylene glycol and (C) from 0.1 to 10% by weight of a zinc oxide, where the sum of the percentages by weight of components (A) to (C) in each case gives 100%, is suitable for the production of moldings for applications with direct contact with diesel fuel or gasoline. Moldings produced therefrom satisfy the increased demands regarding resistance to aged fuels, diesel fuel at high long-term service temperatures and aggressive gasoline.

9 Claims, No Drawings

POLYOXYMETHYLENE MOLDINGS HAVING IMPROVED RESISTANCE TO DIESEL FUEL AND AGGRESSIVE GASOLINE

The invention relates to the use of polyoxymethylene molding compositions comprising polyethylene glycol and zinc oxide for the production of moldings which are employed in direct contact with diesel fuel or aggressive gasoline.

Owing to their excellent mechanical properties and good chemical resistance, polyoxymethylenes (POM) have been employed for years for many applications in automobiles. In particular, the high resistance to fuels is utilized in fuel conveying units. In the existing applications, the requisite crash requirements in particular must be satisfied, which requires adequate toughness of the components.

The temperature requirements made hitherto of components made from POM in fuel supply and return systems were at service temperatures of up to 60° C. Under these conditions, many years of experience from vehicle operation showed that POM satisfies the requirements made extremely well.

In the engine generations recently developed by the automobile industry, the heat resistance requirements made, in particular, of vehicles operated with diesel fuel are being shifted to significantly higher values of 100° C. or above. The components made from POM must therefore also satisfy these increased demands. However, it has been found that the diesel fuel ages at the high temperatures and has a damaging effect on POM. Thus, for example, sulfur or sulfur-containing compounds present in the diesel fuel are oxidized on contact with air to give acidic sulfur compounds, which have a decomposing action on POM. The damage is evident in test specimens from measurable weight loss and loss of toughness (example reduced elongation at break).

On the other hand, it is also known that gasoline fuels can age, possibly with formation of aggressive ageing products. In order to simulate ageing processes of this type and their effect on components, particularly aggressive gasoline fuels are employed in stability tests, for example in accordance with US standard SAE J 1681. These fuels generally have a particularly acid and oxidative character and can thus, like diesel fuels, have a damaging effect on POM. Components which are intended for applications with direct fuel contact must, however, meet these higher demands. The automobile industry in particular requires such tests.

The object of the present invention was therefore to find a polyoxymethylene molding composition which enables the production of components which meet the increased demands made of the resistance to diesel fuel and aggressive gasoline.

One way of improving the resistance to diesel fuel is given in the patent specification DE 197 02 425 A1. The desired improvement is achieved here by the addition of from 0.1 to 2% by weight of least one sterically hindered amine compound.

The present invention indicates a completely new way of achieving the desired effect. The additives employed here are ZnO and polyalkylene glycol, which causes an additional improvement in the toughness.

The invention relates to the use of a thermoplastic molding composition comprising a mixture of (A) from 80 to 99.8% by weight of a polyoxymethylene homopolymer or copolymer (B) from 0.1 to 10% by weight of a polyalkylene glycol (C) from 0.1 to 10% by weight of a zinc oxide where the sum of the percentages by weight of components (A) to (C) in each case gives 100%, for the production of moldings for applications with direct contact with diesel fuel or gasoline.

In accordance with the invention, the base polymer (component A) employed is a known polyoxymethylene as described, for example, in DE-A 2 947 490. These are essentially unbranched linear polymers which generally comprise at least 80 mol %, preferably at least 90 mol %, of oxymethylene units (—$CH_2O$—). The term polyoxymethylenes here covers both homopolymers of formaldehyde or cyclic oligomers thereof, such as trioxane or tetroxane, and corresponding copolymers. Homopolymers of formaldehyde or trioxane are polymers whose hydroxyl end groups have been chemically stabilized against degradation in a known manner, for example by esterification or etherification. Copolymers are polymers of formaldehyde or cyclic oligomers thereof, in particular trioxane, and cyclic ethers, cyclic acetals and/or linear polyacetals.

Suitable comonomers are in particular cyclic ethers having 3, 4 or 5, preferably 3, ring members, cyclic acetals, other than trioxane, having from 5 to 11, preferably 5, 6, 7 or 8, ring members, and linear polyacetals. The proportion of the co-components in the polymer is generally from 0.1 to 20 mol %, preferably from 0.5 to 10 mol %. The most suitable copolymers are those comprising from 95 to 99.5 mol % of trioxane and from 0.5 to 5 mol % of one of the abovementioned co-components.

The proportion of the polyoxymethylene in the mixture according to the invention is preferably from 95 to 99% by weight.

The polyalkylene glycol preferably has a mean molecular weight of from 10,000 to 45,000, in particular from 20,000 to 40,000. Its proportion in the mixture is preferably from 0.5 to 5% by weight, particularly preferably from 1 to 3% by weight. Preferred polyalkylene glycols are polyethylene glycol and polypropylene glycol, particularly preferably polyethylene glycol.

The proportion of zinc oxide in the mixture is preferably from 0.5 to 5% by weight, particularly preferably from 0.5 to 3% by weight.

The mixture according to the invention can comprise additives, such as stabilizers, nucleating agents (especially talc), antistatics, light stabilizers, lubricants, plasticizers, pigments, dyes, optical brighteners, processing auxiliaries and the like in the requisite amounts.

Suitable polyacetal stabilizers against the effect of heat are, in particular, polyamides, amides, for example dicyandiamide, hydrazines, ureas, poly(N-vinyllactams) and alkaline earth metal salts of aliphatic, preferably hydroxyl-containing, mono- to tribasic carboxylic acids having 2 to 20 carbon atoms, for example calcium stearate, calcium ricinoleate, calcium lactate and calcium citrate. The oxidation stabilizers used are, in particular, bisphenol compounds, preferably diesters of monobasic 4-hydroxyphenylalkanoic acids containing from 7 to 13, preferably 7, 8 or 9, carbon atoms.

Examples of suitable light stabilizers are alpha-hydroxybenzophenone derivatives and benzotriazole derivatives.

The stabilizers are usually employed in a total amount of from 0.1 to 5% by weight, in particular in amounts of from 0.5 to 3% by weight, based on the entire molding composition. Depending on the composition, however, amounts which deviate from this may also be necessary.

The mixture according to the invention may furthermore also comprise fillers and reinforcing materials (D). These can be, inter alia, fibrous reinforcing materials, such as glass fibers, carbon fibers, etc., and non-fibrous fillers, such as glass powder, graphite, carbon black, metal powders, metal oxides, silicates, carbonates and molybdenum(IV) sulfide.

These fillers may have been provided with an adhesion promoter or adhesion promoter system. The total amount of fillers and/or reinforcing materials (D) is usually up to 50% by weight, preferably of from 5 to 40% by weight, based on the total mixture of components (A)–(D).

The mixtures according to the invention are prepared, for example, by intensively mixing the constituents at elevated temperature, i.e. in general at temperatures above the melting point of component A, i.e. at from about 160 to 250° C., preferably at from 180 to 220° C., in equipment with a good mixing action, for example in compounders or extruders, advantageously in twin-screw extruders. The pulverulent components are usually first mixed mechanically at room temperature and subsequently melted for complete homogenization.

On use of additives, fillers and reinforcing materials, however, it may also be advantageous to employ masterbatches or concentrates thereof. Fibrous materials can, for example, also be fed to the mixing equipment, in particular the extruder, as continuous material.

The thermoplastic molding compositions which can be used in accordance with the invention are distinguished by a balanced property profile. Moldings produced therefrom are suitable for high long-term service temperatures of up to 100° C. in contact with diesel fuel and for long-term contact with aged or aggressive gasoline. Compared with POM molding compositions containing no or only one of components (B) and (C), the molding compositions according to the invention are characterized by both low chemical degradation and by low loss of mechanical properties.

The possible areas of application include, in particular, fuel tanks, fuel lines, connecting pieces, valve bodies as well as fuel conveying units and fuel level sensors. Possible components in fuel conveying units and fuel level sensors are, for example, flanges, splash pots, pump holders, fuel pumps, pump lids, filter sieves, etc.

EXAMPLES

The following components were employed for Examples 1, 2, 3 and 4 according to the invention and for Comparative Example I:

Component A

Polyoxymethylene copolymer comprising 98.6% by weight of trioxane and 1.4% by weight of dioxolane. The melt volume rate was 12.5 cm$^3$/10 min. (190 ° C., 2.16 kg loading weight in accordance with ISO 1133).

Component B

Polyethylene glycol 35000 P from Clariant GmbH; polyethylene glycol having a mean molecular weight of 35,000.

Component C

Zinc oxide aktive® from Bayer AG.

The POM copolymer was mixed with the parts by weight of the corresponding components shown in Table 1 and melted in a ZE 25 ×33 D twin-screw extruder (Berstorff, Hanover, Federal Republic of Germany) at a material temperature of 200° C. and subsequently granulated.

The granules were dried at 120° C. for eight hours and then injection molded to give test specimens for the storage trials and mechanical tests. The processing conditions were selected in accordance with the recommendations in ISO 9988-2, material standard for POM.

Storage and Measurements:

Before each storage, five test specimens were weighed in order to determine the initial weight. In addition, a further five test specimens were used as control sample for determining the mechanical properties in the tensile test. The reason why ISO ¼ tensile test pieces (in earlier ISO 527), which have a thickness of only 1 mm, were used rather than type 1 A tensile test pieces (ISO 527-1,2), which have a thickness of 4 mm, is that a significantly greater measurement effect for material degradation and the mechanical properties is found at smaller dimensions.

The test specimens were stored for 500 hours at a temperature of 100° C. in test diesel fuel RF 73-A-93 from Haltermann in a glass vessel with reflux condenser and valve for excluding air. The fuel volume was about 2 l and was blanketed by about 1 l of air. The fuel was changed weekly.

The test specimens were removed after storage, and adhering liquid residues were removed with a cloth. The weight change after storage was determined by means of a second weighing. A tensile test in accordance with ISO 527 was then carried out with the stored samples at a tension rate of 12.5 mm/min.

Table 1 shows the compositions of the materials with the corresponding test results.

TABLE 1

| | I | 1 | 2 | 3 | 4 |
|---|---|---|---|---|---|
| Component A [% by wt.] | 100 | 97 | 98 | 99 | 98 |
| Component B [% by wt.] | — | 2.0 | 1.0 | — | 2.0 |
| Component C [% by wt.] | — | 1.0 | 1.0 | 1.0 | — |
| Weight change [%] | −17.9 | −3.3 | −2.6 | −1.9 | −8.4 |
| Elongation at break before storage [%] | 69.4 | 60.1 | 58.1 | 62.9 | 72.8 |
| Elongation at break after storage [%] | 12.3 | 35 | 36.4 | 22.5 | 22.9 |
| Change in elongation at break [%] | −82.3 | −41.8 | −37.4 | −64.2 | −68.5 |

It is clearly evident that material degradation is significantly reduced by components B and C. The best results with least loss of elongation at break and low material degradation are achieved with a combination of components B and C.

What is claimed is:

1. A thermoplastic molding composition consisting of (A) from 30 to 99.8% by weight of a polyoxymethylene homopolymer or copolymer, (B) from 0.1 to 10% by weight of a polyalkylene glycol, (C) from 0.1 to 10% by weight of a zinc oxide and (D) from 0 to 50% by weight of fillers, reinforcing materials and/or additives wherein the additives are selected from the group consisting of stabilizers, nucleating agents, antistatics, light stabilizers, lubricants, plasticizers, pigments, dyes, optical brighteners, processing auxiliaries, and mixtures thereof.

2. The composition as claimed in claim 1, wherein the polyalkylene glycol has a mean molecular weight of from 10,000 to 45,000.

3. The composition as claimed in claim 1, wherein the polyalkylene glycol used is polyethylene glycol or polypropylene glycol.

4. The composition as claimed in claim 3, wherein the polyalkylene glycol has a mean molecular weight from 20,000 to 40,000 and is present in amount from 0.5 to 5% by weight.

5. The composition as claimed in claim 4, wherein the polyalkylene glycol is present in amount from 1 to 3% by weight and the zinc oxide is present in amount from 0.5 to 30% by weight.

6. The composition as claimed in claim 5, wherein from 0.1 to 5% by weight is an additive and said additive is a stabilizer.

7. The composition as claimed in claim 1, wherein the zinc oxide is present in amount from 0.5 to 5% by weight.

8. The composition as claimed in claim 1, wherein the molding composition is used as a fuel tank, a fuel line, bow body, a fuel conveying unit or a fuel level sensor.

9. A process for producing moldings which are in direct contact with diesel fuel or gasoline which consists of mixing from 30 to 99.8% by weight a polyoxymethylene homopolymer or copolymer, (B) from 0.1 to 10% by weight of a polyalkylene glycol and (C) from 0.1 to 10% by weight of a zinc oxide and (D) from 0 to 50% by weight of fillers, reinforcing materials and/or additives wherein the additives are selected from the group consisting of stabilizers, nucleating agents, antistatics, light stabilizers, lubricants, plasticizers, pigments, dyes, optical brighteners, processing auxiliaries, and mixtures thereof and said moldings are used in direct contact with diesel fuel or gasoline.

* * * * *

UNITED STATES PATENT AND TRADEMARK OFFICE
CERTIFICATE OF CORRECTION

PATENT NO. : 6,489,388 B1
DATED : December 3, 2002
INVENTOR(S) : Kurz et al.

It is certified that error appears in the above-identified patent and that said Letters Patent is hereby corrected as shown below:

Column 5,
Line 4, delete "30%" and insert -- 3% --.

Signed and Sealed this

Eleventh Day of March, 2003

JAMES E. ROGAN
*Director of the United States Patent and Trademark Office*